US008851524B2

(12) United States Patent
Roberts et al.

(10) Patent No.: US 8,851,524 B2
(45) Date of Patent: Oct. 7, 2014

(54) POSITIVE COMPLETION COUPLER INSERT AND COUPLER

(75) Inventors: Michael Roberts, Staffordshire (GB); John Michael Morris, Auburn, WA (US); Barry Martin, Wocestershire (GB)

(73) Assignee: Norgren Limited, Staffordshire (GB)

( * ) Notice: Subject to any disclaimer, the term of this patent is extended or adjusted under 35 U.S.C. 154(b) by 855 days.

(21) Appl. No.: 12/447,408

(22) PCT Filed: Nov. 10, 2006

(86) PCT No.: PCT/EP2006/010815
§ 371 (c)(1),
(2), (4) Date: Apr. 27, 2009

(87) PCT Pub. No.: WO2008/055532
PCT Pub. Date: May 15, 2008

(65) Prior Publication Data
US 2010/0045030 A1    Feb. 25, 2010

(51) Int. Cl.
*F16L 37/096* (2006.01)
*B60T 17/04* (2006.01)
*F16L 37/092* (2006.01)

(52) U.S. Cl.
CPC ........... *F16L 37/0925* (2013.01); *B60T 17/043* (2013.01); *F16L 2201/10* (2013.01); *F16L 2201/80* (2013.01)
USPC ........................................................ 285/243

(58) Field of Classification Search
CPC ......... F16L 37/02; F16L 37/025; F16L 37/04; F16L 37/08; F16L 37/084; F16L 37/0845; F16L 37/0842; F16L 47/06

USPC ............................. 285/243, 93, 921, 239, 331
See application file for complete search history.

(56) References Cited

U.S. PATENT DOCUMENTS

| 4,747,621 A * | 5/1988 | Gans et al. ................. 285/7 |
| 4,793,637 A | 12/1988 | Laipply et al. |
| 4,875,714 A * | 10/1989 | Lee ........................... 285/86 |
| 5,104,157 A * | 4/1992 | Bahner ....................... 285/307 |
| 5,120,085 A * | 6/1992 | Shin ........................... 285/317 |
| 5,226,679 A | 7/1993 | Klinger |
| 6,193,283 B1 | 2/2001 | Pickett et al. |
| 6,338,506 B1 | 1/2002 | Kubota et al. |
| 6,340,180 B1 | 1/2002 | Wisniewski |
| 2003/0098583 A1 | 5/2003 | Clinche |

FOREIGN PATENT DOCUMENTS

| CH | 392170 A * | 5/1965 | ........... F16L 37/084 |
| GB | 2217417 A | 10/1989 | |
| WO | WO-2006/037962 A | 4/2006 | |

* cited by examiner

*Primary Examiner* — Daniel P Stodola
*Assistant Examiner* — James Linford
(74) *Attorney, Agent, or Firm* — The Ollila Law Group LLC

(57) ABSTRACT

A positive completion coupler insert (100) configured to be inserted into a coupler (150) is provided according to the invention. The coupler insert (100) includes a conduit support insert (110) configured to be retained in a coupler bore (151) of the coupler (150) and a conduit support (140) configured to fit into and be retained by the conduit support insert (110). The conduit support (140) is configured to generate a first audible sound when inserted to a first insertion point in the conduit support insert (110) and is configured to generate a second audible sound when inserted to a second insertion point.

6 Claims, 5 Drawing Sheets

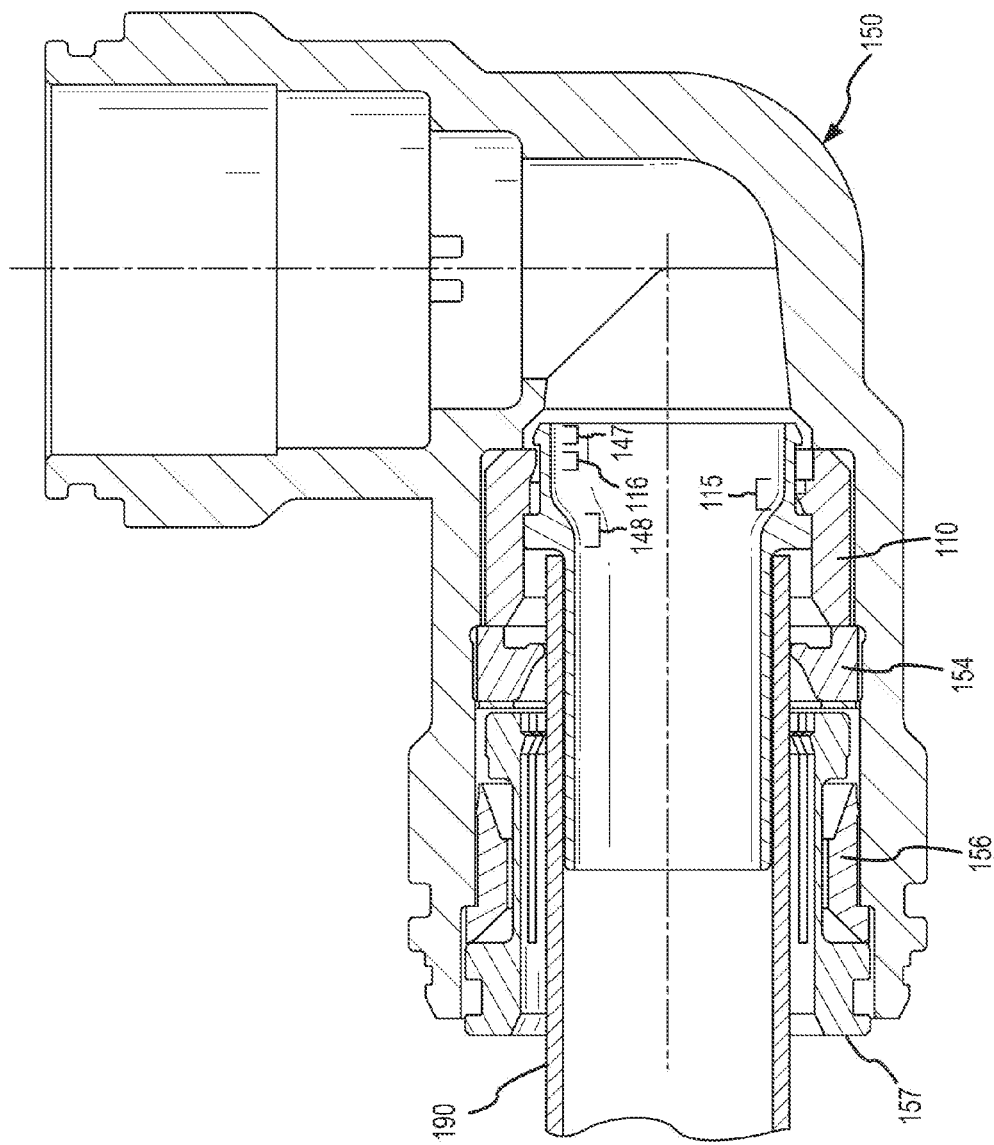

POSITIVE COMPLETION COUPLER INSERT AND COUPLER

BACKGROUND OF THE INVENTION

1. Field of the Invention

The present invention relates to a positive completion coupler insert and coupler.

2. Statement of the Problem

Many large vehicles employ pneumatic systems for some onboard components or systems. For example, trucks typically include air brakes connected to an air system. The air brakes can include multiple axles or can include tractor and trailer brake systems. A system of hoses connects various components of the air system.

Assembly of a vehicle air system may include connecting hoses to couplers. Assembly of air systems for vehicles is one area in which hoses or lines may be required to be connected in the factory. Typically, an assembly worker pushes a hose into a corresponding coupler. This assembly is complete when the hose comes into contact with an inside end of the coupler. Therefore, in the prior art, proper and complete assembly relies on the assembly worker's experience and attentiveness in performing the insertion of the hose.

Improper assembly of hoses to corresponding couplers can lead to inspection failures or customer complaints. Failure of a coupler connection in an air brake system can result in sudden and unexpected deployment of the vehicle's brakes. Therefore, it is very important that the assembly process be efficient and highly failure-proof.

SUMMARY OF THE INVENTION

A positive completion coupler insert configured to be inserted into a coupler is provided according to an embodiment of the invention. The coupler insert comprises a conduit support insert configured to be retained in a coupler bore of the coupler and a conduit support configured to fit into and be retained by the conduit support insert. The conduit support is configured to generate a first audible sound when inserted to a first insertion point in the conduit support insert and is configured to generate a second audible sound when inserted to a second insertion point.

A positive completion coupler for a conduit is provided according to an embodiment of the invention. The coupler comprises a coupler bore, a conduit support insert configured to be retained in the coupler bore, and a conduit support configured to fit into and be retained by the conduit support insert. The conduit support is configured to generate a first audible sound when inserted to a first insertion point in the conduit support insert and is configured to generate a second audible sound when inserted to a second insertion point.

A method of assembling a conduit to a positive completion coupler is provided according to an embodiment of the invention. The method comprises inserting a conduit support into a conduit support insert to a first insertion point with regard to the conduit support insert. A first audible sound is generated at the first insertion point by the conduit support insert and the conduit support. The method further comprises inserting the conduit support insert into a coupler bore of the coupler. The method further comprises inserting a conduit into the coupler and moving the conduit support to a second insertion point with regard to the conduit support insert. A second audible sound is generated at the second insertion point by the conduit support insert and the conduit support.

ASPECTS OF THE INVENTION

In one embodiment of the coupler insert, the conduit support comprises a support portion adapted to receive a conduit and a head portion joined to the support portion, with the head portion including a first ring and a second ring extending outwardly from the head portion, with the first ring being spaced apart from the second ring.

In yet another embodiment of the coupler insert, the plurality of first projections pass over the first ring to reach a first insertion point during assembly of the conduit support to the conduit support insert.

In yet another embodiment of the coupler insert, the plurality of second projections pass over the first ring to reach a second insertion point during assembly of the conduit to the conduit support insert and the conduit support.

In yet another embodiment of the coupler insert, the plurality of first projections comprises three first projections.

In yet another embodiment of the coupler insert, the plurality of second projections comprises three second projections.

In one embodiment of the coupler, the conduit support insert comprises a body, a first aperture formed in the body, a second aperture formed in the body and connecting with the first aperture, one or more first projections formed in the first aperture and projecting inward into the first aperture, and one or more second projections formed in the second aperture and projecting inward into the second aperture.

In another embodiment of the coupler, the conduit support comprises a support portion adapted to receive a conduit and a head portion joined to the support portion, with the head portion including a first ring and a second ring extending outwardly from the head portion, with the first ring being spaced apart from the second ring.

In yet another embodiment of the coupler, the plurality of first projections pass over the first ring to reach a first insertion point during assembly of the conduit support to the conduit support insert.

In yet another embodiment of the coupler, the plurality of second projections pass over the first ring to reach a second insertion point during assembly of the conduit to the conduit support insert and the conduit support.

In yet another embodiment of the coupler, the plurality of first projections comprises three first projections.

In yet another embodiment of the coupler, the plurality of second projections comprises three second projections.

In one embodiment of the method, the conduit support insert comprises a body, a first aperture formed in the body, a second aperture formed in the body and connecting with the first aperture, one or more first projections formed in the first aperture and projecting inward into the first aperture, and one or more second projections formed in the second aperture and projecting inward into the second aperture.

In another embodiment of the method, the conduit support comprises a support portion that receives the conduit and a head portion joined to the support portion, with the head portion including a first ring and a second ring extending outwardly from the head portion, with the first ring being spaced apart from the second ring.

In yet another embodiment of the method, the plurality of first projections pass over the first ring to reach the first insertion point during assembly of the conduit support to the conduit support insert.

In yet another embodiment of the method, the plurality of second projections pass over the first ring to reach the second insertion point during assembly of the conduit to the conduit support insert and the conduit support.

In yet another embodiment of the method, the plurality of first projections comprises three first projections.

In yet another embodiment of the method, the plurality of second projections comprises three second projections.

DESCRIPTION OF THE DRAWINGS

The same reference number represents the same element on all drawings. It should be understood that the drawings are not necessarily to scale.

FIG. 6 shows the coupler after the conduit support insert and the conduit support have been inserted to the second insertion point by the insertion of the conduit.

DETAILED DESCRIPTION OF THE INVENTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
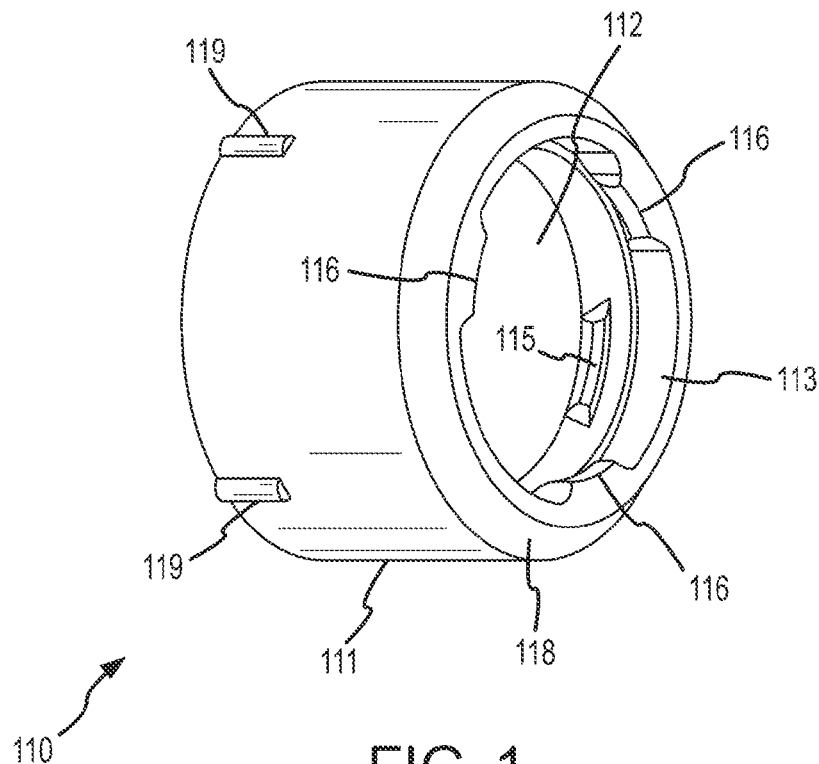
FIG. 1 shows a conduit support insert according to an embodiment of the invention.

FIG. 1 shows a conduit support insert 110 according to an embodiment of the invention. Components in common with other figures share reference numbers. The conduit support insert 110 is configured to be assembled to a conduit support 140 (see FIGS. 3-4) and the two components are further assembled to a coupler 150 (see FIGS. 5-6).

Figure 2:
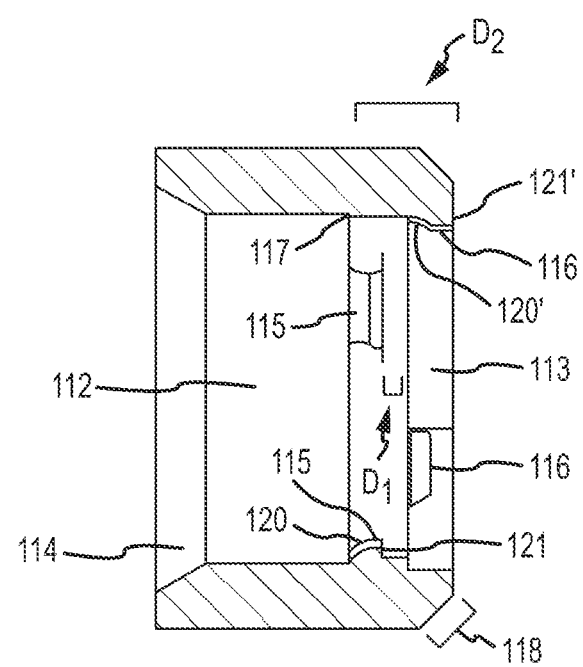
FIG. 2 is a cross-section of the conduit support insert according to an embodiment of the invention.

FIG. 2 is a cross-section of the conduit support insert 110 according to an embodiment of the invention. The conduit support insert 110 includes a body 111, a first aperture 112, and a second aperture 113. The second aperture 113 connects with the first aperture 112. In one embodiment, the second aperture 113 is smaller than the first aperture 112. In another embodiment, a shoulder 117 is formed within the first apeture between an end of the first aperature 112 and one or more first projections 115.

In one embodiment, the body 111 is substantially cylindrical and the first and second apertures 112 and 113 are substantially cylindrical. However, other shapes are contemplated and are within the scope of the description and claims.

The first aperture 112 includes a plurality of first projections 115 projecting inward into the first aperture 112. In the embodiment shown, three first projections 115 are included in the conduit support insert 110. However, it should be understood that other numbers of first projections 115 are contemplated and are within the scope of the description and claims.

The second aperture 113 includes a plurality of second projections 116 projecting inward into the second aperture 113. In the embodiment shown, three second projections 116 are included in the conduit support insert 110. In the embodiment shown, the number of second projections 116 matches the number of first projections 115. However, it should be understood that other numbers of second projections 116 are contemplated and are within the scope of the description and claims.

The first and second projections 115 and 116 are used to affix or removably affix a conduit support 140 to the conduit support insert 110 during assembly. The first and second projections 115 and 116 therefore define first and second insertion points (see FIGS. 5-6). The first insertion point is reached when the conduit insert 140 is partially assembled to the conduit support insert 110. A second insertion point is reached when a conduit 190 is assembled to the coupler 150.

It can be seen that a first projection 115 can include a substantially sloped face 120 and a substantially perpendicular face 121. The sloped face 120 is contacted by a first ring 147 of the conduit support 140 when the conduit support 140 is being inserted into the conduit support insert 110 to the first insertion point. The sloped face 120 provides ease of insertion and provides a substantially self-aligning feature to the assembly of the two components. The first ring 147 snaps over and engages the perpendicular face 121 of the first projection 115 when the conduit support 140 has been inserted to the first insertion point. As a result, a first snap or click sound is generated, indicating the engagement of the first ring 147 with the perpendicular face 121. However, other projection shapes are contemplated and are within the scope of the description and claims.

A second projection 116 can include a substantially sloped face 120' and a substantially perpendicular face 121'. The sloped face 120' is contacted by the first ring 147 of the conduit support 140 (see FIG. 3) when the conduit support 140 is being inserted into the conduit support insert 110 to the second insertion point. The first ring 147 snaps over and engages the perpendicular face 121' of the plurality of second projections 116 when the conduit support 140 has been inserted to the second insertion point. As a result, a second snap or click sound is generated, indicating the engagement of the first ring 147 with the perpendicular face 121'. However, other projection shapes are contemplated and are within the scope of the description and claims.

The second insertion point is achieved during assembly of a conduit 190 to the coupler 150 (see FIG. 6), wherein the conduit support insert 110 and the conduit support 140 may already be assembled to the coupler 150. No rotation or other manipulation is required.

The first projections 115 are spaced apart from the second projections 116 by a predetermined separation distance D1. The predetermined separation distance D1 is substantially equal to or larger than the size of the first ring 147.

The first and second projections 115 and 116 create a predetermined span D2. The predetermined span D2 is substantially equal to or less than a span D3 of the conduit support 140 (see FIG. 3).

The pluralities of projections 115 and 116 are of a predetermined height. The height must create enough energy to generate a relatively loud (i.e., audible) snap or click sounds during assembly. The plurality of first projections 115 in one embodiment is substantially the same height as the plurality of second projections 116. Alternatively, the two sets of projections 115 and 116 can be of different heights.

The pluralities of projections 115 and 116 can comprise any shape. The pluralities of projections 115 and 116 can include rounded projections (i.e., lobes) or can comprise substantially planar faces. The faces can meet at any desired angle.

Projections are used in the invention instead of a continuous ridge. Because the invention was developed to provide audible sounds when the conduit support 140 is assembled to the conduit support insert 111 and when a conduit is fully installed to a coupler, a new and unique coupler mechanism has been developed. The coupler mechanism has to provide a satisfactory sound level, provide a positive and reliable coupling action, and provide the coupling action without requiring excessive or undue force. A circular ridge requires too much force for insertion of the conduit support 140 in order to generate a desired sound level. Alternatively, if the height of the circular ridge is reduced in order to reduce the insertion force, then the energy created by the ridge during insertion will not create a satisfactory sound level.

The plurality of second projections 116 can be offset from the plurality of first projections 115. The offsetting can aid in the manufacturing of the conduit support insert 110. However, the offset does not affect the insertion process, and no rotation is required during the insertion of the conduit support 140 into the conduit support insert 110.

The conduit support insert 110 can additionally include a chamfer 118. The chamfer 118 can aid in the alignment and insertion of the conduit support insert 110 into the coupler 150. The conduit support insert 110 can further include a second aperture flare 114 that eases the insertion of the conduit 190 into the coupler 150.

The conduit support insert 110 can further include one or more projections 119. The one or more projections 119 can offer grip surfaces and can further provide a predetermined insertion force when the conduit support insert 110 is inserted into the coupler 150. Moreover, the projections 119 can be of a size to ensure that the conduit support insert 110 fits snugly into the bore 151 of the coupler 150.

Figure 3:
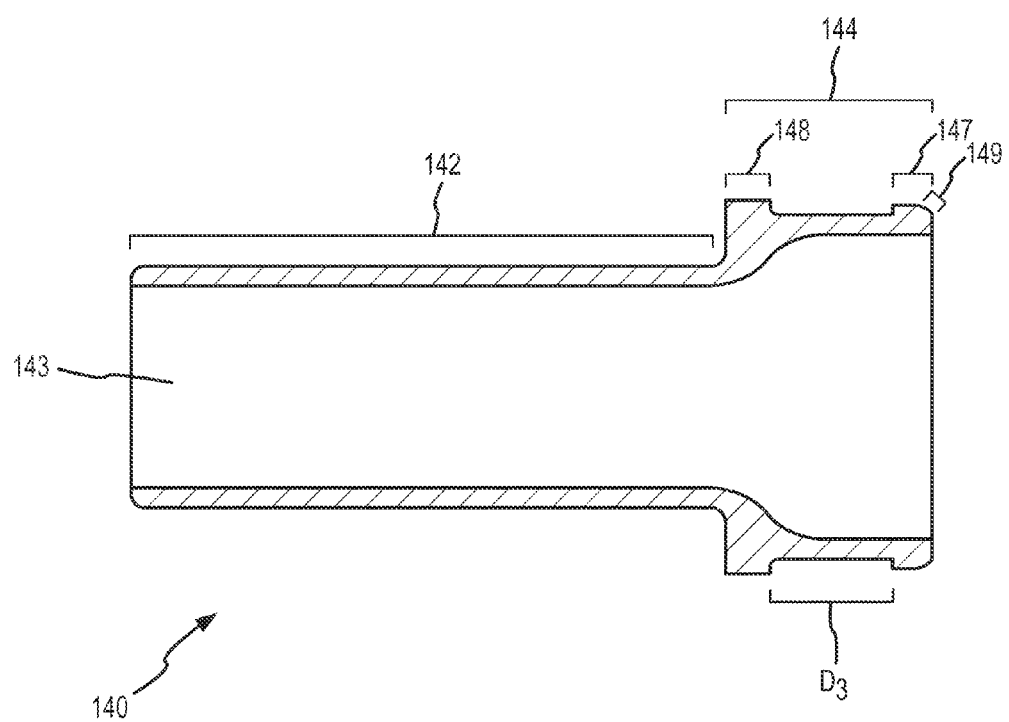
FIG. 3 shows the conduit support according to an embodiment of the invention.

FIG. 3 shows the conduit support 140 according to an embodiment of the invention. The conduit support 140 includes a substantially cylindrical support portion 142 and a head portion 144 that engages the conduit support insert 110. The conduit support 140 further includes a bore 143 that extends through both the support portion 142 and the head portion 144. The head portion 144 further includes the first ring 147 and the second ring 148. The first ring 147 is spaced apart from the second ring 148 and is separated from the second ring 148 by a span D3. The first ring 147 is configured to pass over and subsequently engage the plurality of first and second projections 115 and 116 of the conduit support insert 110.

In the embodiment shown, the first ring 147 includes a chamfer 149. The chamfer 149 eases passage of the first ring 147 past both projections 115 and 116. In the embodiment shown, the second ring 148 is substantially rectangular in cross-sectional shape. It should be understood that other shapes can be used for the first and second rings 147 and 148.

It should be understood that alternatively the first ring 147 can comprise a plurality of projections, while the plurality of first and second projections 115 and 116 can comprise uninterrupted rings.

Figure 4:
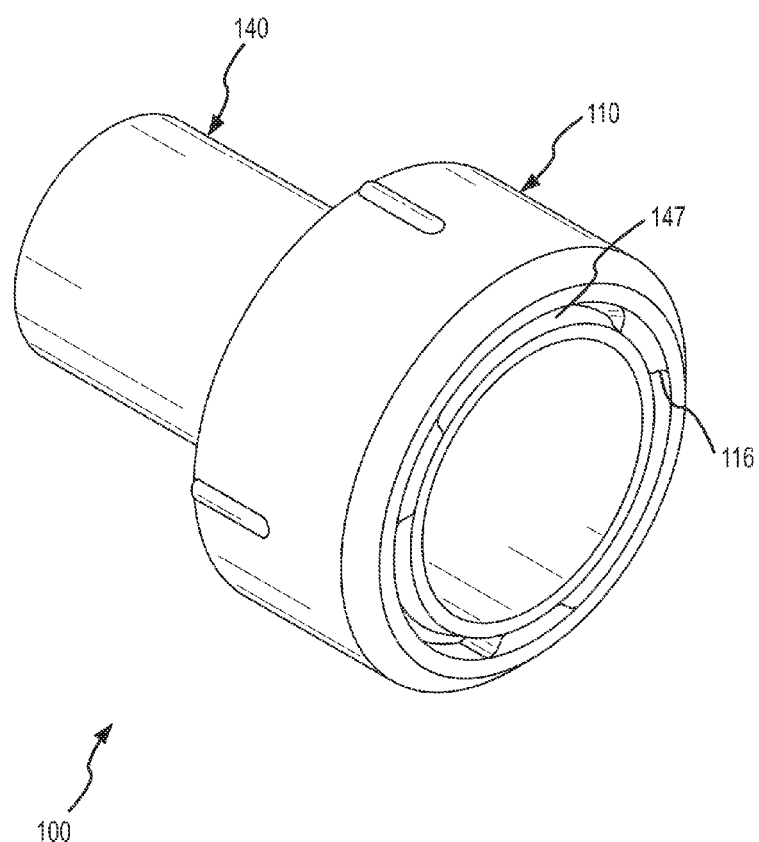
FIG. 4 shows the conduit support assembled to the conduit support insert according to an embodiment of the invention.

FIG. 4 shows the conduit support 140 assembled to the conduit support insert 110 according to an embodiment of the invention. The conduit support 140 has been partially inserted into the conduit support insert 110 to the first insertion point. Here, the first ring 147 has passed over the plurality of first projections 115, but has not passed over the plurality of second projections 116 (see also FIG. 5 and the discussion below). The two components can now be assembled to the coupler 150. Alternatively, the conduit support insert 110 can be assembled to the coupler 150 and then the conduit support 140 can be assembled to the conduit support insert 110.

Figure 5:
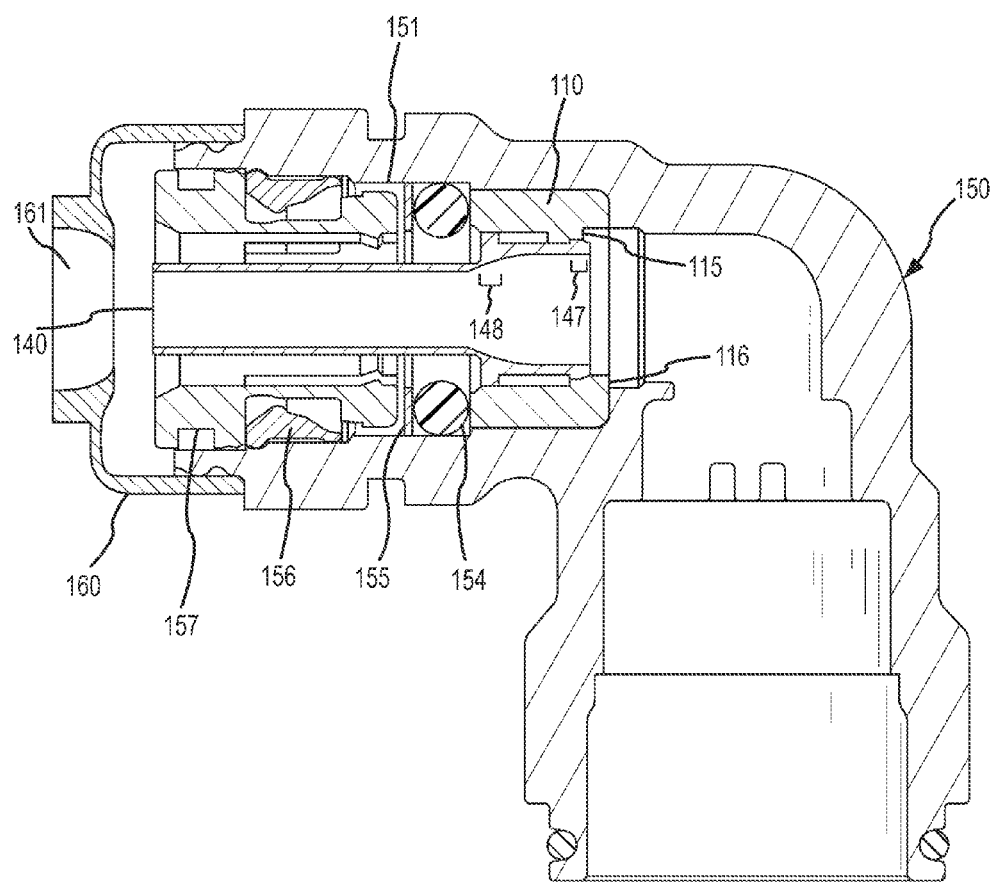
FIG. 5 shows the conduit support and the conduit support insert assembled to a coupler according to an embodiment of the invention.

FIG. 5 shows the conduit support 140 and the conduit support insert 110 assembled to the coupler 150 according to an embodiment of the invention. The coupler 150 includes a coupler bore 151. The conduit support 140 and the conduit support insert 110 are inserted into the coupler bore 151. In this figure, the conduit support 140 and the conduit support insert 110 have been assembled to the first insertion point. The first ring 147 has passed over the plurality of first projections 115, but has not passed over the plurality of second projections 116.

The conduit support insert 110 can be retained in the coupler bore 151 by other coupler components. For example, in the embodiment shown the coupler 150 further includes a seal 154, a washer (or spacer) 155, a collet retainer 156, and a collet 157. The collet 157 is held in the coupler bore 151 by the collet retainer 156 in this embodiment. The collet retainer 156 can include one or more projections or ridges that engage by means of interference in the coupler bore 151. The coupler 150 can further include a dust cap 160 that keeps dust and dirt out of the end of the coupler 150. The conduit 190 can pass through a dust cap aperture 161 in the dust cap 160.

FIG. 6 shows the coupler 150 after the conduit support insert 110 and the conduit support 140 have been moved to the second insertion point by the insertion of the conduit 190. At this point in the assembly process, the first ring 147 has already passed over the plurality of first projections 115. Subsequently, in this figure the inserted conduit 190 pushes the conduit support 140 far enough into the conduit support insert 110 that the first ring 147 now passes over the plurality of second projections 116, as shown in the figure. The first ring 147 deforms during this process. In addition, the one or more second projections 116 can also deform somewhat during this process. Afterwards, the first ring 147 quickly returns to an original configuration, accompanied by a snapping or clicking sound. The second ring 148 acts as an insertion depth limit, wherein the second ring 148 hits the shoulder 117 and stops the conduit support 140 from moving further into the conduit support insert 110.

An alternate configuration of the seal 154 is shown. The seal 154 can place a retaining force on the conduit 190, along with ridges or other mechanisms of the collet 157.

Advantageously, the conduit support insert 110 and the conduit support 140 can provide an audible signal when the first insertion point has been achieved. Likewise, the conduit support insert 110 and the conduit support 140 can provide an audible signal when the second insertion point has been achieved. This ensures that assembly of the conduit 190 to the coupler is satisfactorily performed. Full insertion of the conduit 190 leads to more efficient assembly and fewer quality issues.

What is claimed is:

1. A positive completion coupler insert (100) configured to be inserted into a coupler (150), the coupler insert (100) comprising:
    a conduit support insert (110) configured to be retained in a coupler bore (151) of the coupler (150), with the conduit support insert (110) being a one-piece body comprising:
        a first aperture (112) formed in a body (111) and a second aperture (113) formed in the body (111) and connecting with the first aperture (112), with a shoulder (117) formed within the first aperture (112);
        one or more first projections (115) formed in the first aperture (112) and projecting inward into the first aperture (112), with the one or more first projections (115) being non-continuous around a common interior surface circumference of the first aperture (112) and the shoulder (117) being located between an end of the first aperture (112) and the one or more first projections (115); and
        one or more second projections (116) formed in the second aperture (113) and projecting inward into the second aperture (113), with the one or more second projections (116) being non-continuous around a common interior surface circumference of the second aperture (113), wherein the first aperture (112) has a first diameter and the second aperture (113) has a second diameter, the first diameter being different from the second diameter; and a conduit support (140) configured to fit into and be retained by the conduit support insert (110), with the conduit support (140) comprising:

a support portion (142) adapted to receive a conduit (190); and a head portion (144) joined to the support portion (142), with the head portion (144) including a first ring (147) and a second ring (148) extending outwardly from the head portion (144), with the first ring (147) being spaced apart from the second ring (148);

wherein the first ring (147) passes over and resiliently snaps over the one or more first projections (115) to reach a first insertion point during assembly of the conduit support (140) to the conduit support insert (110) and wherein the conduit support (140) is configured to generate a first audible sound when inserted to the first insertion point in the conduit support insert (110);

wherein the first ring (147) passes over and resiliently snaps over the one or more second projections (116) to reach a second insertion point during assembly of the conduit (190) to the conduit support insert (110) and the conduit support (140) and wherein the conduit support (140) is configured to generate a second audible sound when inserted to the second insertion point; and wherein the second ring (148) rests against the shoulder (117 when the first ring (147) is at the second insertion point.

2. The coupler insert (100) of claim 1, with the one or more first projections (115) comprising three first projections (115).

3. The coupler insert (100) of claim 1, with the one or more second projections (116) comprising three second projections (116).

4. A positive completion coupler (150) for a conduit (190), the coupler (150) comprising:

a coupler bore (151);

a conduit support insert (110) configured to be retained in the coupler bore (151), with the conduit support insert (110) being a one-piece body comprising:

a first aperture (112) formed in a body (111) and a second aperture (113) formed in the body (111) and connecting with the first aperture (112), with a shoulder (117) formed within the first aperture (112);

one or more first projections (115) formed in the first aperture (112) and projecting inward into the first aperture (112), with the one or more first projections (115) being non-continuous around a common interior surface circumference of the first aperture (112) and the shoulder (117) being located between an end of the first aperture (112) and the one or more first projections (115); and one or more second projections (116) formed in the second aperture (113) and projecting inward into the second aperture (113), with the one or more second projections (116) being non-continuous around a common interior surface circumference of the second aperture (113), wherein the first aperture (112) has a first diameter and the second aperture (113) has a second diameter, the first diameter being different from the second diameter; and a conduit support (140) configured to fit into and be retained by the conduit support insert (110), with the conduit support (140) comprising:

a support portion (142) adapted to receive a conduit (190); and a head portion (144) joined to the support portion (142), with the head portion (144) including a first ring (147) and a second ring (148) extending outwardly from the head portion (144), with the first ring (147) being spaced apart from the second ring (148);

wherein the first ring (147) passes over and resiliently snaps over the one or more first projections (115) to reach a first insertion point during assembly of the conduit support (140) to the conduit support insert (110) and wherein the conduit support (140) is configured to generate a first audible sound when inserted to the first insertion point in the conduit support insert (110);

wherein the first ring (147) passes over and resiliently snaps over the one or more second projections (116) to reach a second insertion point during assembly of the conduit (190) to the conduit support insert (110) and the conduit support (140) and wherein the conduit support (140) is configured to generate a second audible sound when inserted to the second insertion point; and wherein the second ring (148) rests against the shoulder (117 when the first ring (147) is at the second insertion point.

5. The coupler (150) of claim 4, with the one or more first projections (115) comprising three first projections (115).

6. The coupler (150) of claim 4, with the one or more second projections (116) comprising three second projections (116).

* * * * *